United States Patent
Tashiro et al.

[11] Patent Number: 6,036,619
[45] Date of Patent: Mar. 14, 2000

[54] CONTROLLER OF AUTOMATIC TRANSMISSION HAVING A LOCKUP CLUTCH AND CONTROL METHOD OF THE AUTOMATIC TRANSMISSION

[75] Inventors: Tsutomu Tashiro, Nagoya; Tetsuji Kozaki, Chita-gun; Masami Fujitsuna, Kariya, all of Japan

[73] Assignee: Denso Corporation, Kariya, Japan

[21] Appl. No.: 08/948,938

[22] Filed: Oct. 10, 1997

[30] Foreign Application Priority Data

Oct. 14, 1996 [JP] Japan ................................. 8-270906

[51] Int. Cl.[7] ............................ F16H 61/58; F16H 61/04; B60K 41/02
[52] U.S. Cl. ............................... 477/64; 477/154; 477/83
[58] Field of Search ....................... 477/109, 154, 477/64, 63, 65, 184, 83; 475/66

[56] References Cited

U.S. PATENT DOCUMENTS

| | | |
|---|---|---|
| 4,466,311 | 8/1984 | Hiramatsu . |
| 4,468,988 | 9/1984 | Hiramatsu . |
| 4,715,145 | 12/1987 | Takeda et al. ............................ 477/63 |
| 4,978,328 | 12/1990 | Pierce ....................................... 475/66 |
| 5,179,875 | 1/1993 | Brown ................................. 477/155 X |
| 5,303,616 | 4/1994 | Palansky et al. ......................... 477/63 |
| 5,486,146 | 1/1996 | Asahara et al. ........................... 477/65 |
| 5,580,331 | 12/1996 | Shiraishi et al. ........................ 477/109 |
| 5,612,874 | 3/1997 | Schulz et al. ......................... 477/68 X |
| 5,634,869 | 6/1997 | Mikami et al. ...................... 477/109 X |
| 5,709,768 | 1/1998 | Tashiro et al. ........................ 477/65 X |
| 5,792,021 | 8/1998 | Minowa et al. ..................... 477/109 X |
| 5,853,350 | 12/1998 | Hasegawa et al. ...................... 477/166 |

FOREIGN PATENT DOCUMENTS

| | | |
|---|---|---|
| 58-124860 | 7/1983 | Japan . |
| 4-290675 | 10/1992 | Japan . |
| 6-17920 | 1/1994 | Japan . |

*Primary Examiner*—Charles A Marmor
*Assistant Examiner*—Roger Pang
*Attorney, Agent, or Firm*—Pillsbury Madison & Sutro LLP

[57] ABSTRACT

A controller of an automatic transmission having a lockup clutch and a control method of the automatic transmission, in which engine rotational speed is prevented from changing even though turbine rotational speed changes at gear shift and slip control can be carried out without making a driver feel uncomfortable are provided. When a speed change command is detected and it is determined that an inertia phase has not yet started, target engine rotational speed during a replenish period is calculated and the target engine rotational speed control is carried out to have the target engine rotational speed. When it is determined that the control is in the inertia phase, another target engine rotational speed during the inertia phase is calculated. Then, target engine rotational speed control in which the engine rotational speed at the start of the inertia phase is maintained as the target engine rotational speed is carried out.

12 Claims, 6 Drawing Sheets

CONTROLLER OF AUTOMATIC TRANSMISSION HAVING A LOCKUP CLUTCH AND CONTROL METHOD OF THE AUTOMATIC TRANSMISSION

CROSS-REFERENCE TO RELATED APPLICATION

This application is related to Japanese Patent Application No. Hei 8-270906, incorporated herein by reference.

BACKGROUND OF THE INVENTION

1. Field of the Invention

The present invention relates to a controller of an automatic transmission having a lockup clutch whose closing force is controllable and a control method of such an automatic transmission.

2. Description of Related Art

For a conventional automatic transmission provided with a torque converter which connects an output shaft of an engine and an input shaft of a speed change mechanism through fluid, an automatic transmission provided with the torque converter and a lockup clutch in parallel to transmit force in the driving system efficiently has been disclosed. The lockup clutch is a friction clutch capable of transmitting mechanical force between the output and the input shafts.

Recently, by controlling engagement force (closing force) of the lockup clutch, a control of the lockup clutch controlling a transmitting state of the force at the torque converter, that is, a slip control of the lockup clutch (hereinafter referred to slip control) is carried out.

The slip control is carried out for reducing the slip quantity of the torque converter, reducing the transmission loss of the driving force and reducing fuel consumption.

On the other hand, when the slip quantity of the torque converter is too small, torque vibration generated by an engine is transmitted to the output shaft or torque amplification of the torque converter is not operated, so that the driver feels uncomfortable.

Therefore, in the slip control, the slip quantity between the input shaft and the output shaft of the torque converter is controlled by controlling the closing force of the lockup clutch so that the fuel consumption is reduced and deterioration of the driver can be prevented from feeling uncomfortable.

Further, in the slip control, depending on the driving state, there are two different cases where reduction of the fuel consumption takes precedence over the driver's feelings or where the driver's feelings take precedence over the reduction of the fuel consumption. Therefore, the slip quantity of the torque converter needs to be determined properly at each driving state.

For example, the torque amplification operation of the torque converter is not required in a traveling state with a constant throttle opening, so that reduction of the fuel consumption takes precedence over the driver's feelings and a very small slip quantity is appropriate. On the other hand, when the driver depresses the accelerator, a larger slip quantity is preferable to improve the torque amplification operation of the torque converter.

In Japanese Examined Patent Publication No. Sho 63-13060, for example, target slip quantity is determined in a range to be less than the slip quantity when the driving force is transmitted only by the torque converter and to reduce or stop the transmission of torsional vibration.

Further, the closing force of the lockup clutch is controlled to make the difference between the real slip quantity and the target slip quantity smaller.

When the real slip quantity comes close to the target slip quantity, only the engine rotational speed changes and turbine rotational speed which is the output shaft rotational speed of the torque converter does not change. This is because when the vehicle is driven by the engine output, that is, when the engine output is connected to the output shaft of the vehicle, inertia of the input side of the torque converter is smaller than inertia of the output side thereof. Therefore, only the rotational speed in the input side which has the smaller inertia is changed.

Therefore, the target slip quantity is determined and the real slip quantity comes close thereto, that is, the engine rotational speed is determined to be larger than the turbine rotational speed by the target slip quantity with the turbine rotational speed as a reference.

When the speed change is in a transitional period, the change in the turbine rotational speed is not always guaranteed to be constant due to the change in engine torque and the state of the speed change clutch. For example, when the speed change is completed much faster than when it was designed and the adjusting control of the target slip quantity is carried out, the sudden change in the engine rotational speed is required, so that the torque shocks are generated.

In a transmission for separately hydraulic-controlling clutches in the closing side and the opening side, when timings of closing and opening of the clutch do not match, the turbine rotational speed is suddenly increased or decreased, and the transmission moves differently compared with its normal movement at the speed change. In this case, when the adjusting control to the target slip quantity is carried out, an abnormal change in the turbine rotational speed superimposes onto the engine rotational speed, which results in changes in engine sound, vibrations in the tachometer, torque shocks and the like. Thus, the driver feels uncomfortable.

Especially, when the abnormal change in the engine rotational speed occurs before a gear ratio change, the tachometer suddenly moves up or down during the constant traveling of the vehicle, so that the driver feels uncomfortable due to abnormal changes of the throttle operation and the tachometer. On the other hand, when the abnormal change in the engine rotational speed occurs while the gear ratios are changing, that is, during an inertia phase, the tachometer goes up and down although the values are usually reduced together with the gear ratio change, so that the driver feels uncomfortable.

SUMMARY OF THE INVENTION

In view of the above problems of the prior art, it is a primary object of the present invention to provide a controller of an automatic transmission having a lockup clutch and a control method of the automatic transmission. When slip control of the lockup clutch is carried out, the controller prevents changes in engine rotational speed although turbine rotational speed changes with the speed change and slip control is carried out without making a driver feel uncomfortable.

The above object is achieved according to a first aspect of the present invention by regulating engaging force using an engaging force regulating device so that slip quantity is controlled to target slip quantity, that is, in a control device for carrying out a slip control of a lockup clutch, a target engine rotational speed control for controlling the engine rotational speed to the target engine rotational speed is carried out instead of the slip control during speed change of the automatic transmission.

In other words, in the present invention, real slip quantity of a torque converter is not controlled to the target slip quantity, but the real engine rotational speed is controlled to come close to the target engine rotational speed. Therefore, unnecessary change in the output shaft rotational speed (turbine rotational speed) of the torque converter does not superimpose onto the engine rotational speed. Therefore, because the engine rotational speed does not change abnormally, change in the engine sound due to abnormal change in the engine rotational speed, vibrations in the tachometer, torque shock and the like are not generated.

The speed change period is a speed change transitional period (inertia phase period) in which speed change ratios change; however, the target engine rotational speed control can be carried out during a period before and after the inertia phase.

For example, the target engine rotational control can be carried out not only during the inertia phase but also during a period (that is, a replenish period) from the generation of the speed change switch command to the start of the inertia phase. If the target engine rotational speed control is carried out during the replenish period, transfer from the target slip quantity control started before the target engine rotational speed control is smooth without shocks and the like. In the transmission in which clutches in the closing side and the opening side are oil-pressure-controlled independently, a phenomenon in which the turbine rotational speed is suddenly increased or decreased due to mismatching of the timing of closing and opening of the clutch occurs before the start of the inertia phase. Therefore, the change in the turbine rotational speed can be prevented from superimposing onto the engine rotational speed. Because the speed change ratio is determined during the replenish period, the target engine rotational speed can be determined from the speed change ratio and the engine rotational speed.

When the target engine rotational speed is continued for a predetermined period after the completion of the inertia phase, the transfer from the target engine rotational speed control to the conventional slip quantity control can be carried out smoothly without shocks and the like.

The above object is achieved according to a second aspect of the present invention, by providing a device for carrying out the target engine rotational speed control, (for example, the friction state can be changed by oil pressure) in which a device for regulating the engaging force (closing force) of the lockup clutch by an engaging force regulating device can be applied.

That is, when the engaging force is strengthened, the engine rotational speed is reduced. On the other hand, when the engaging force is weakened, the engine rotational speed is increased. Therefore, by regulating the engaging force, the engine rotational speed can come close to the target engine rotational speed.

According to a third aspect of the present invention, for a device for carrying out the target engine rotational speed control, a device for regulating engine output torque can be applied.

That is, for example, by regulating the engine output torque by controlling a throttle opening degree, the engine rotational speed can be controlled directly. Therefore, the engine rotational speed can come close to the target engine rotational speed.

According to a fourth aspect of the present invention, when the speed change switch command is detected by the speed change command detecting device, the target engine rotational speed control is started.

The present invention regulates timing of the start of the target engine rotational speed control. Before detecting the speed change, the target engine rotational speed control is started immediately after the speed change switch command is generated. That is, the time when the speed change is started is detected based on the change and the like of the turbine rotational speed; however, the timing cannot always be detected precisely and the timing can be delayed. Therefore, when the target engine rotational speed control is started after detecting the start of the inertia phase, the control can be delayed. Therefore, in the present invention, by starting the target engine rotational speed control when the speed change switch command is detected, the target engine rotational speed control can be surely carried out during the speed change.

According to a fifth aspect of the present invention, when the start of the inertia phase (indicating the start of the speed change) is detected, a value corresponding to the engine rotational speed at the start of the inertia phase or the engine rotational speed is to be the target rotational speed.

That is, because the target engine rotational speed during the inertia phase is to be the engine rotational speed and the like at the start of the inertia phase, reduction and change in the engine rotational speed during the speed change do not occur and smooth slip control can be carried out. Especially, because the target engine rotational speed is maintained at a predetermined value during the speed change, the slip quantity is increased and the torque amplification operation becomes large.

Be cause the engine rotational speed at the start of the inertia phase is the engine rotational speed when the inertia phase is detected, the engine rotational speed is different from the engine rotational speed when the inertia phase is really started. Therefore, by considering the difference, the value corresponding to the engine rotational speed when the inertia phase is detected, for example, a value in which a predetermined value is added to the detected engine rotational speed can be applied.

According to a sixth aspect of the present invention, when the start of the inertia phase is detected, the target engine rotational speed is set so that the target engine rotational speed is reduced by a predetermined slope from the engine rotational speed at the start of the inertia phase or the value corresponding to the engine rotational speed.

That is, by setting the target engine rotational speed during the inertia phase to be reduced by the predetermined slope from the engine rotational speed and the like at the start of the inertia phase, the engine rotational speed comes close to the turbine rotational speed to reduce the slip quantity and the change in the engine rotational speed can be prevented. Therefore, the slip control can be carried out smoothly and the transmission loss of the driving force can be reduced with a little slip quantity, so that the fuel consumption can be reduced.

For the engine rotational speed at the start of the inertia phase, the engine rotational speed when the inertia phase is detected can be applied. If the engine rotational speed (the value corresponding to the engine rotational speed) is the approximated value, the same effect as described above is obtained.

According to a seventh aspect of the present invention, the predetermined slope is set in response to the amount of engine torque.

When the engine torque differs, the state of reduction in the turbine rotational speed during the inertia phase differs, so that the slope of the target engine rotational speed is set in response to the engine torque and the difference (slip quantity) between the turbine rotational speed and the engine rotational speed is appropriate. Concretely, the larger the engine torque is, the larger the slope of the turbine becomes (the slope is steep), so that it is preferable that when the engine torque is large, the reduction slope of the target engine rotational speed is large.

Even when the engine torque differs, the slip control in which the driver feels comfortable can be carried out because the slip quantity is appropriate.

According to an eighth aspect of the present invention, the predetermined slope is set in response to the engine rotational speed at the speed change switch command or the turbine rotational speed of the torque converter.

In general, when the engine rotational speed or the turbine rotational speed before the speed change is large, the rotational speed difference between the engine rotational speed or the turbine rotational speed before and after the speed change becomes large and the slope of the engine rotational speed or the turbine rotational speed becomes steep. Therefore, if the target engine rotational speed is maintained at the predetermined slope, the slip quantity is reduced a great deal due to the set value at the speed change and low speed in the process of speed change. Therefore, the reduction slope of the target engine rotational speed is set in response to the engine rotational speed or the turbine rotational speed at the speed change command, so that regardless of the set value at the speed change and the low speed in the process of speed change, the slip control in which the driver feels comfortable can be carried out.

Especially, in the present invention, because the value at the speed change switch command is used, the engine rotational speed and the turbine rotational speed before the start of the inertia phase can be applied without fail. That is, when the inertia phase is really started, the engine rotational speed and the turbine rotational speed are suddenly reduced. Therefore, by using the engine rotational speed and the turbine rotational speed to set the reduction slope of the target engine rotational speed, it is possible that the slip quantity changes extremely. According to the present invention, (compared with the value at the start of the inertia) there may be some errors; however, there is less chance to obtain a value which is significantly different from the real value.

According to a ninth aspect of the present invention, the predetermined slope is set in response to the engine rotational speed or the turbine rotational speed at the start of the inertia phase.

Because the reduction slope of the target engine rotational speed can be set in response to the engine rotational speed or the turbine rotational speed at the start of the inertia phase, when the start of the inertia phase is detected precisely, a more appropriate value can be applied compared with the eighth aspect of the present invention. Therefore, the slip control in which the driver is comfortable can be carried out.

According to a tenth aspect of the present invention, the predetermined slope is set so that the slope of the change in the engine rotational speed is substantially fixed.

Therefore, compared with the slip control in which the slip quantity of the conventional torque converter is constant, the change in the engine rotational speed can be reduced and the torque shocks and the like are not generated, so that the slip control in which the driver is comfortable can be carried out.

According to an eleventh aspect of the present invention, the predetermined slope is set so that the time period of the change in the engine rotational speed is substantially fixed.

Therefore, for example, even though the engine rotational speed and the turbine rotational speed at the start of the inertia phase differ due to conditions, the time period of the changing in the engine rotational speed regarding the speed change can be maintained constant, so that the appropriate target engine rotational speed in response to the real change in the engine rotational speed during the inertia phase can be set. Thus, an increase of the fuel consumption due to an increase of the slip quantity during the speed change can be prevented.

According to a twelfth aspect of the present invention, the target engine rotational speed control is set to be completed when the engine rotational speed falls below a predetermined value calculated from the turbine rotational speed and the target slip quantity.

The present invention sets the timing in which the target engine rotational speed control is completed. For example, the predetermined value is set to (the turbine rotational speed+the target slip quantity) or if there is an overshoot, the predetermined value is set to (the turbine rotational speed+target slip quantity+an additional value). Therefore, the adjusting control to the target engine rotational speed can be completed smoothly.

According to a thirteenth aspect of the present invention, in the control method of the automatic transmission having the lockup clutch for controlling the slip quantity between the input shaft and the output shaft of the torque converter by regulating the engaging force of the lockup clutch disposed with the torque converter in parallel, the target engine rotational speed control for controlling the engine rotational speed to the target engine rotational speed during the speed change in the automatic transmission is carried out.

The present invention controls the real engine rotational speed to come close to the target engine rotational speed, so that unnecessary change in the output shaft rotational speed of the torque converter does not superimpose onto the engine rotational speed. Therefore, because the engine rotational speed does not change abnormally during the speed change, change in the engine sound, vibration in the tachometer, torque shocks and the like due to the abnormal change in the engine rotational speed are not generated.

The speed change period is the inertia phase. The target engine rotational speed control can be continued during a period before and after the inertia phase, so that the same effect as described above can be obtained.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 4 is a graph of areas of the gear shifting line of the shift-up and the shift-down, a lockup area and the like;

DETAILED DESCRIPTION OF THE PRESENTLY PREFERRED EXEMPLARY EMBODIMENTS

Embodiments of a controller of an automatic transmission having a lockup clutch and a control method of the automatic transmission in the present invention are explained with reference to the drawings.

First Embodiment

Figure 1:
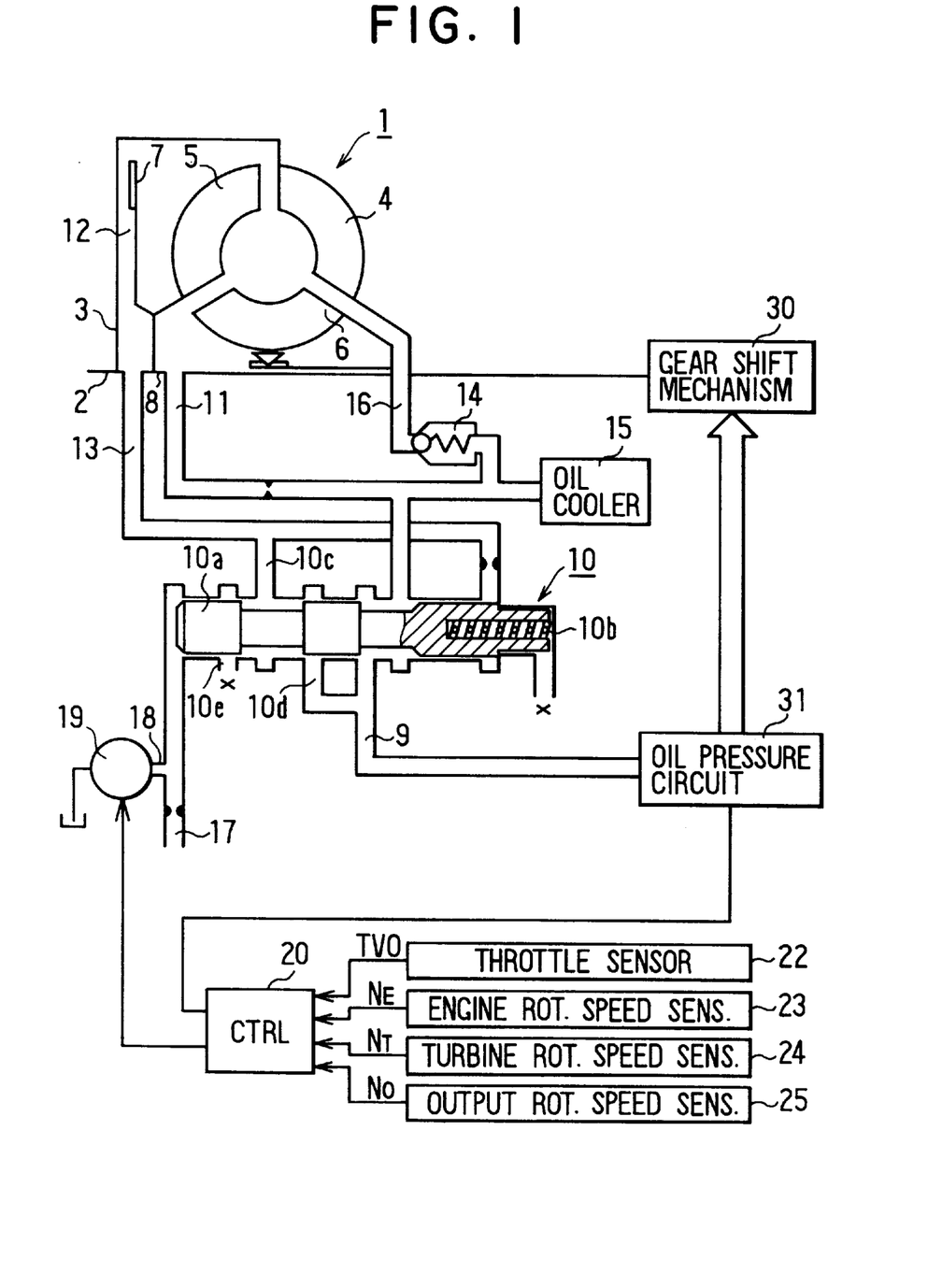
FIG. 1 is a schematic construction view of an overall automatic transmission control system providing a control device according to a first embodiment of the present invention.

FIG. 1 illustrates a construction of a torque converter with the lockup clutch and an oil pressure circuit and a control device for carrying out a oil-pressure control.

A torque converter 1 includes a pump 4, a turbine 5, a stator 6 and a lockup clutch 7. The pump 4 rotates integrally with an engine output shaft 2 inside a case 3 connected to the engine output shaft 2. The turbine 5 is rotatably provided at another side in the case 3 to face the pump 4 and is an output member rotatably driven by rotation of the pump 4 through hydraulic oil and rotates integrally with an input shaft 8 of a gear shift mechanism 30. The stator 6 is disposed between the pump 4 and the turbine 5 to carry out a torque amplification operation when the speed ratio of turbine rotational speed (output shaft rotational speed of the torque converter 1) versus pump rotational speed is less than or equal to a predetermined value. The lockup (direct connection) clutch 7 is disposed between the turbine 5 and the case 3.

The torque converter 1 directly connects the engine output shaft 2 and the input shaft 8 of the gear shift mechanism 30 through the case 3 when the rotation of the turbine 5 is transmitted to the input shaft 8 of the gear shift mechanism 30 and the turbine 5 is connected to the case 3.

In the gear shift mechanism 30, friction closing factors (not shown) and movements of planetary gears (not shown) are controlled by a movement of a gear shift oil pressure circuit 31 to shift gears to four forward gears and one reverse gear. Although the present embodiment illustrates the gear transmission for shifting gears by switching operations of the friction engaging factors, a non-stage transmission may be used.

The gear shift oil pressure circuit 31 is actuated based on a command of a control computer 20 described later and determines closing pressure of the friction closing factors and line pressure which is oil pressure of a main line 9 of a lockup oil pressure circuit (described later) other than switching of gear stages by the gear shift mechanism 30.

Next, the oil pressure circuit for controlling the operation of the torque converter 1 is explained.

The hydraulic oil is introduced into the torque converter 1 by the main line lead from an oil pump (not shown) through a lockup valve 10 and a converter line 11. The lockup clutch 7 is always biased to a closing direction by pressure of the hydraulic oil.

A lockup release line 13 which is lead from the lockup valve 10 communicates with a space 12 between the lockup clutch 7 and the case 3. The lockup clutch 7 is released when oil pressure (release pressure) is introduced into the space 12 from the lockup release line 13. A converter outline 16 for transmitting the hydraulic oil to an oil cooler 15 through a check valve 14 is connected to the torque converter 1.

The lockup valve 10 includes a spool 10a and a spring 10b for biasing the spool 10a toward the left in FIG. 1 and a pressure adjusting port 10d and a drain port 10e are provided at both sides of a port 10c to which the lockup releasing line 13 is connected. A control line 17 for operating a pilot pressure to the spool 10a is connected to an end portion of the lockup valve 10 in a left side of the figure and a conventional liquid pressure regulator 19, for example, a duty solenoid valve, is provided on a drain line 18 branching off from the control line 17.

The liquid pressure regulator 19 opens and closes the drain line 18 at an extremely short period of time by repeating ON and OFF by duty ratio corresponding to an input signal, and regulates the pilot pressure inside the control line 17 to be a value corresponding to the duty ratio.

The pilot pressure is determined so that the releasing pressure inside the lockup releasing line 13 is provided to the spool 10a of the lockup valve 10 in the same direction as the biasing force of the spring 10b. Therefore, the spool 10a moves by a force relation between the oil pressure and the biasing force and the lockup releasing line 13 communicates with the main line 9 (pressure-adjusting port 10d) or the drain port 10e, so that the lockup releasing pressure is regulated at the value corresponding to the pilot pressure, that is, the duty ratio of the liquid pressure regulator 19.

When the duty ratio is at a maximum, a drain amount from the control line 17 is at a maximum and the pilot pressure and the releasing pressure are at a minimum so that the lockup clutch 7 is completely closed. Further, when the duty ratio is at a minimum, the drain amount is at a minimum and the pilot pressure and the releasing pressure are at a maximum so that the lockup clutch 7 is completely released. When the duty ratio is at a middle value between the maximum and the minimum, the lockup clutch 7 is in a slip state and by regulating the releasing pressure corresponding to the duty ratio in the state, the slip quantity of the lockup clutch 7 is controlled.

The above-described control is carried out by the control computer 20 including CPu, ROM, RAM, I/O and the like which are not shown.

Each information signal from a throttle sensor 22 for detecting a throttle opening degree TVO, an engine rotational speed sensor 23 for detecting an engine rotational speed NE, a turbine rotational speed sensor 24 for detecting a turbine rotational speed NT and an output rotational speed sensor 25 for detecting an output shaft rotational speed $N_O$ of the vehicle is inputted to the control computer 20.

Next, normal controls from (1) through (4) which are carried out by the control computer 20 are explained schematically.

Figure 2:
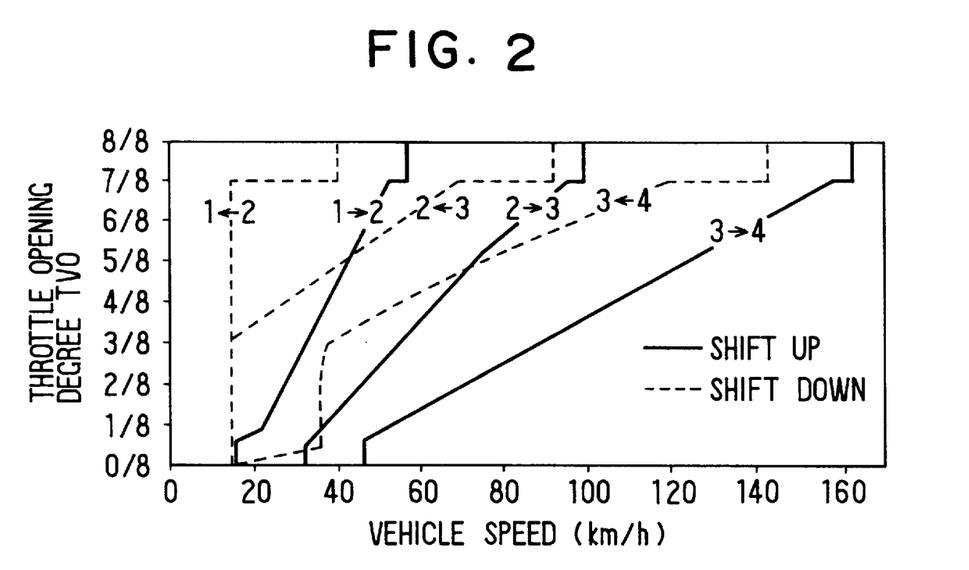
FIG. 2 is a graph of gear shifting lines of up-shift and down-shift of a vehicle.

(1) Switching of the gear shift mechanism 30 operated by the control computer 20 is carried out by switching gears based on a graph illustrated in FIG. 2 with vehicle speed V on a horizontal axis and throttle opening degree TVO on a vertical axis.

The detail is described with examples of an up-shift from a first gear to a second gear and a down-shift from the second gear to the first gear.

The up-shift from the first gear to the second gear is carried out when the control crosses a 1→2 gear shifting line in FIG. 2 from the left to the right or from the top to the bottom, and in this case, the control computer 20 commands switching of the gears from the first gear to the second gear.

The shift-down from the second gear to the first gear is carried out when the control crosses a 2→1 gear shifting line in FIG.2 from the right to the left or from the top to the bottom, and in this case, the control computer 20 commands switching of the gears from the second gear to the first gear.

Figure 3:
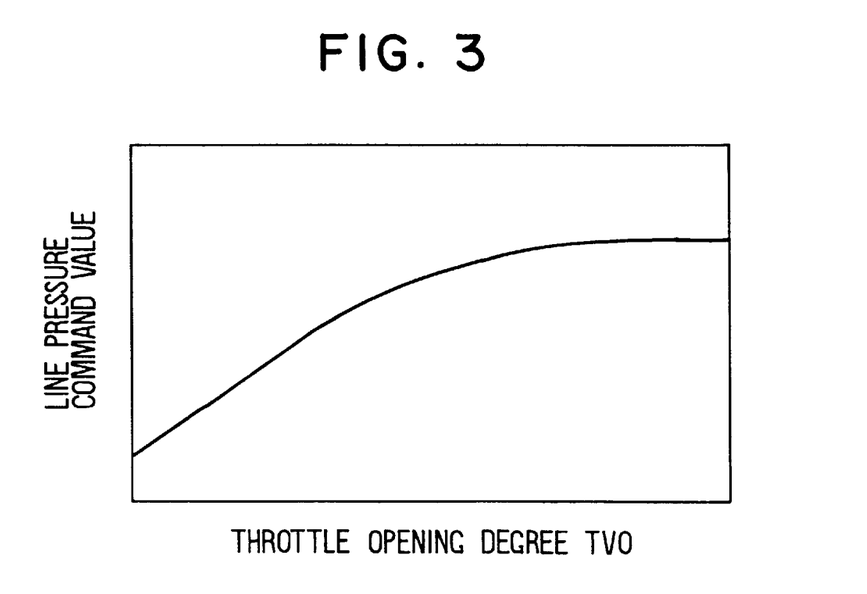
FIG. 3 is a graph of a relationship between line pressure command values and throttle opening degrees.

(2) Regarding a setting of the line pressure, the control computer 20 determines a value corresponding to the engine torque such as a value determined by the throttle opening degree TVO as shown in FIG. 3. The value is determined regardless of the normal engine torque to shorten a wasting time period and prevent shocks when the friction closing factors of the gear shift mechanism 30 are replaced during the speed change.

(3) Next, the lockup control for controlling the lockup state of the lockup clutch 7 is explained.

The control computer 20 calculates and generates the duty ratio provided to the liquid pressure regulator 19 by a built-in program based on sensor data so that the closing force of the lockup clutch 7 built in the torque converter 1 is controlled by steps described below.

Figure 4:
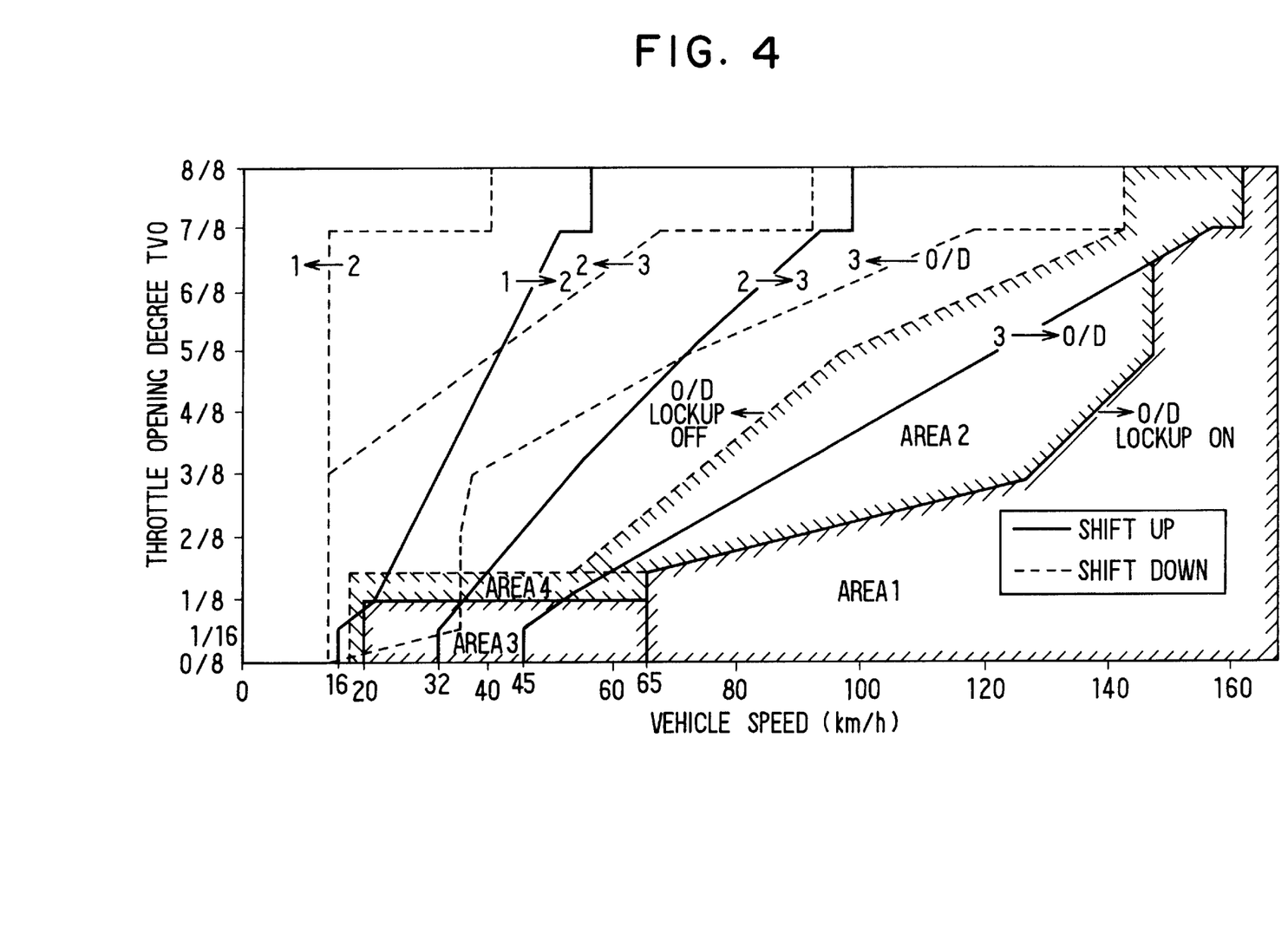

FIG. 4 illustrates a condition of the speed change and a condition for carrying out the lockup control with the vehicle speed V on the horizontal axis and the throttle opening degree TVO on the vertical axis.

When a relationship between the throttle opening degree TVO and the vehicle speed enters an area 1 from an outside area, the maximum value (such as 100%) of the duty ratio is established to close the lockup clutch 7 completely as the complete lockup clutch control. While the relation is in the area 1 or in an area 2, the complete lockup control is continued.

When the relation enters an area 3 from the outside, the slip control (hereafter, referred to the slip control) of the lockup clutch 7 is carried out. That is, the duty ratio is established at an appropriate value between the maximum and the minimum thereof by a determination method of the duty ratio described later to put the lockup clutch 7 in a predetermined slip state. While the relation is in the area 3 or an area 4, the slip control is continued.

In relations other than the above-described relations, the duty ratio is established at a minimum (such as 0%) to release the lockup clutch 7.

As an example of an operation, acceleration at the throttle opening degree of 1/16 is explained. The lockup clutch 7 is open at the beginning.

After the vehicle speed is increased and reaches 16 km/hr, gear shifting from the first gear to the second gear is carried out. The lockup clutch 7 remains open at that time. After the vehicle speed reaches 20 km/hr, slip control in which the lockup clutch 7 is transferred from the complete opening state to the slip state is started. When the vehicle speed reaches 32 km/hr, the gear is shifted from the second to the third and when the vehicle speed reaches 45 km/hr, the gear is shifted from the third to the fourth (O/D). Slip control is continued at that time. Further, when the vehicle speed exceeds 65 km/hr, the lockup clutch 7 is completely closed to carry out complete lockup control.

(4) Next, the slip control is explained with reference to graphs in FIG. 5.

Predetermined throttle opening degree and predetermined vehicle speed are obtained at time $t_0$ and when the start of the slip control is determined, an initial value $D_0$ of the duty ratio is generated. Then, the duty ratio is changed by a duty command value for the target slip quantity control in which the slip quantity is to be followed to the target slip quantity. The target slip quantity, ΔS in this case, is established to prevent the vibration of the engine torque from being transmitted to the gear shift side and to put the rotational speed in a range of between 30 to 80 rpm which is effective for reducing the fuel consumption. An engine rotational speed NE is regulated by adding the predetermined target slip quantity ΔS to the turbine rotational speed NT by the target slip quantity control.

Feedback control using a conventional PID control computation is used for the target slip quantity control. Needless to say, the control system is not limited to the PID control but can use a different calculation method such as a controller constructed by a transfer function, a map search based on rotational speed deflection or the like.

After the vehicle speed is increased, the vehicle speed reaches a gear shift point so that a gear-shift switch command (speed change command) is generated at time $t_1$.

After a predetermined replenish period, speed change transition period (inertia phase) starts at time $t_2$. During the inertia phase or just before the inertia phase, for example, the abnormal change in the rotational speed NT can be generated due to influences such as the oil pressure control of the gear shift clutch and the like. At that time, when the target slip quantity control is continued, the engine rotational speed NE changes unnecessarily, so that the driver feels something is wrong.

Figure 5:
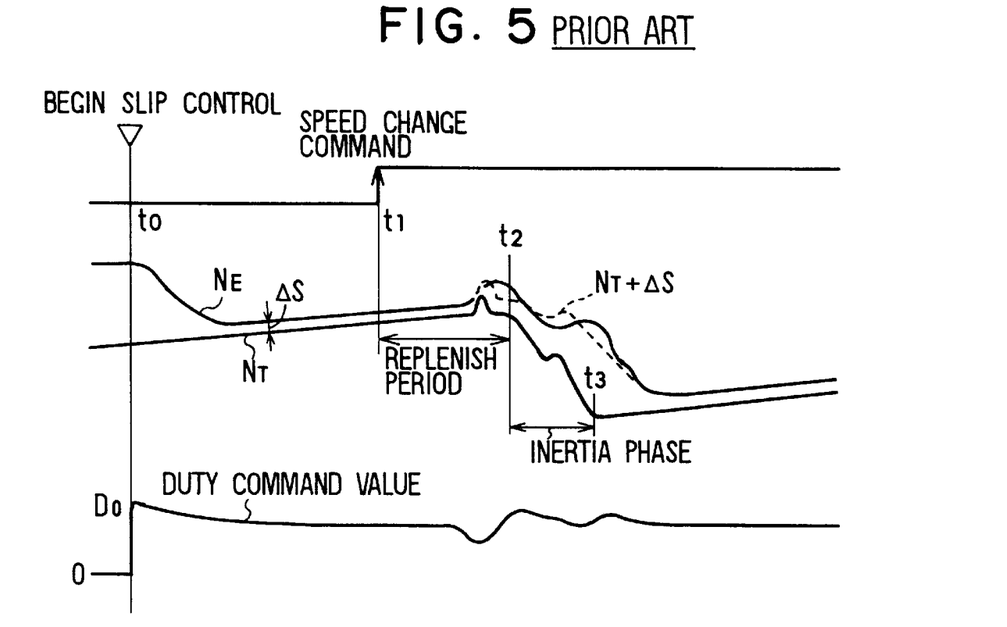
FIG. 5 is an explanatory view of a state of conventional slip control.

The state is shown in FIG. 5 and the timing of replacing the friction engaging factors in the closing side and the opening side does not match and a rise and a sudden drop are generated on the turbine rotational speed NT. A value (shown in dotted lines) in which the predetermined target slip quantity is added to the turbine rotational speed NT becomes a target value to which the engine rotational speed NE comes close. Therefore, resulting from the target slip quantity, the real engine rotational speed NE vibrates significantly, so that driver feels something wrong.

In order to prevent above-described phenomenon, in the present embodiment, a predetermined target value (target engine rotational speed NEr) of the engine rotational speed NE is established during the replenish period after the speed change is commanded and the inertia phase and the whole control is switched to the control (target engine rotational speed control) which has the target value. That is, when the speed change command is detected, the target slip quantity control is switched to the target engine rotational speed control.

The target engine rotational speed control which is a main portion of the present embodiment is explained in detail. In the present embodiment, at least during the inertia phase, the target engine rotational speed NEr is regulated to maintain a constant value.

Figure 6:
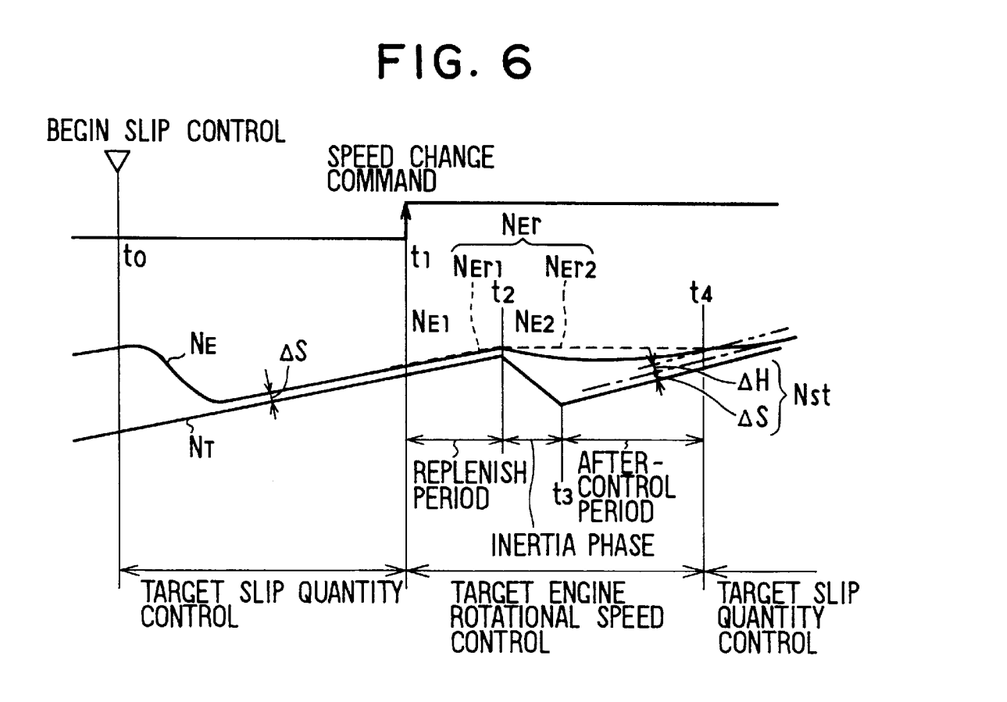
FIG. 6 is an explanatory view of the slip control including a target engine rotational speed control according to the first embodiment.

As shown in FIG. 6, the conventional target slip quantity control in which the slip quantity is maintained at the predetermined target slip quantity ΔS from the time $t_0$ which is the start of the slip control to the time $t_1$ in which the speed change command is generated.

Next, the target engine rotational speed $NEr_1$ is established during the period (replenish period) from the time $t_1$ in which the speed change command is detected to the time $t_2$ in which the start of the inertia phase is detected so that a ratio of the engine rotational speed NEr to the output shaft rotational speed No of the transmission is the same as that at the speed change command.

That is, by using the engine rotational speed NE, at the speed change command time $t_1$ and the output shaft rotational speed $No_1$ of the transmission at the speed change command time $t_2$, a ratio $GNE_0$ of the engine rotational speed $NE_1$ at the speed change command time $t_1$ to the output shaft rotational speed $No_1$ is calculated using the following Equation (1):

$$GNE_0 = NE_1/No_1 \quad (1)$$

By using $GNE_0$, the target engine rotational speed $NEr_1$ during the replenish period is calculated in the following Equation (2):

$$NEr_1 = GNE_0 \times No \quad (2)$$

where No is the output shaft rotational speed of the transmission at the time of calculation.

Here, the starting time $t_2$ of the inertia phase can be detected by the drop of the engine rotational speed NE. Concretely, the time $t_2$ can be determined, for example, by using the turbine rotational speed NT, the output shaft rotational speed No of the transmission and the gear ratio g before the speed change, and whether or not a value of (No×g−NT) exceeds the predetermined value $\Delta NT$ can be determined.

Next, after the start of the inertia phase, the target engine rotational speed control in which the engine rotational speed $NE_2$ at the time $t_2$ which is the start of the inertia phase is maintained constant as the target engine rotational speed $NEr_2$ is carried out.

Therefore, the technique for setting the target engine rotational speed $NEr_1$ in the replenish period is different from that of the target engine rotational speed $NEr_2$ in the inertia phase; however, each is different from the conventional target slip quantity control and performs control based on the predetermined target engine rotational speed NEr. When the target engine rotational speed control is in motion, change in the slip quantity does not matter.

The target engine rotational speed control is continued after the completion (at the time $t_3$) of the inertia phase.

At the time $t_4$, when the engine rotational speed NE falls below a control switch threshold (=the turbine rotational speed NT+the target slip quantity $\Delta S$+determination quantity $\Delta H$) in which the predetermined slip quantity $\Delta Nst$ is added to the turbine rotational speed NT, the control is switched to the normal target slip quantity control.

The value of $\Delta Nst$ is determined to be in the range of about one to three times the value of the target slip quantity $\Delta S$ used in the target slip quantity control and is selected not to generate sudden changes in the engine rotational speed as the control result based on the response characteristics of the oil pressure system. That is, by setting as above, although the target of the following control is changed, since the engine rotational speed changes continuously, shocks are not generated and the control can be carried out without making the driver uncomfortable.

In the present embodiment, the target slip quantity control is carried out during the period (time $t_0$ through time $t_1$) between the start of the slip control and the command of the speed change. The target engine rotational speed control is carried out during a period (time $t_1$ through time $t_4$) in which the speed change by the command of the speed change is completed and the turbine rotational speed NT is increased. Especially, the control is to have the target engine rotational speed NEr, established in response to the gear ratios and the like during the replenish period (time $t_1$ through time $t_2$) and the control is to have a constant target engine rotational speed $NEr_2$ during the inertia phase (time $t_2$ through time $t_3$) and the subsequent control period (time $t_3$ through time $t_4$).

Next, the steps carrying out the above-described control are explained with reference to a flow chart in FIG. 7.

Figure 7:
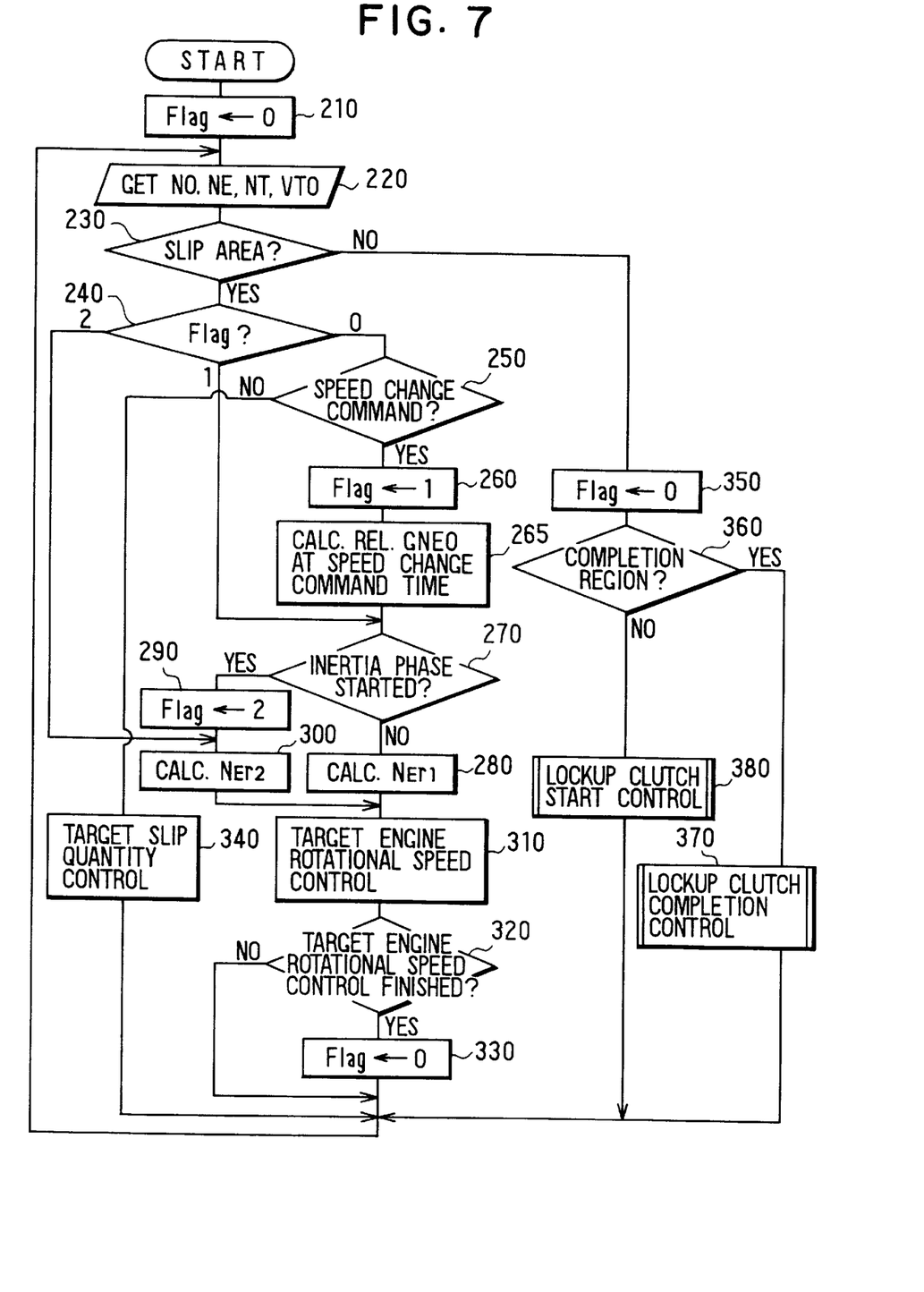
FIG. 7 is a flow chart of a control process according to the first embodiment.

When the control computer 20 is turned on and returns from a reset state, a flag indicating a mode of the target engine rotational speed control is set to zero (non-execution of the target engine rotational speed) in step 210 in FIG. 7.

The output shaft rotational speed No, the engine rotational speed NE, the turbine rotational speed NT and the throttle opening degree TVO are read in step 220.

Step 230 determines whether or not the control is in the slip control area with reference to FIG. 4.

When the control is determined to be in the slip area, the value of the flag is determined in step 240. When the value of the flag is zero, the control goes to step 250.

Step 250 determines whether or not the speed change command is generated. When the determination in step 250 is negative, the control goes to step 340.

Step 340 carries out the conventional target slip quantity control. That is, in order to make the real slip quantity (the engine rotational speed NE−the turbine rotational speed NT) come close to the set target slip quantity $\Delta S$, the driving duty ratio which is provided to the liquid pressure regulator 19 is calculated. The target slip quantity control generating the driving duty ratio is carried out.

When the determination in step 250 is positive, in order to start the target engine rotational speed control during the replenish period, the control proceeds to step 260. The values (the target engine rotational speed control during the replenish period) of the flag are set to 1 for a control process of the next calculation period.

In the subsequent step 265, in order to calculate the target engine rotational speed $NEr_1$ during the replenish period, a ratio $GNE_1$ of the engine rotational speed $NE_1$ at the speed change command and the output shaft rotational speed $No_1$ is calculated in Equation (1), that is, $GNE_0 = NE_1/No_1$.

Step 270 determines whether or not the control is in the inertia phase. Similarly as described before, by using the output shaft rotational speed No, the gear ratio g before the gear shifting and the turbine rotational speed NT, the time in which the value of (No×g−NT) exceeds the predetermined value $\Delta NT$ is determined as the start of the inertia phase.

When the determination in step 270 is negative, calculation of the target engine rotational speed $NEr_1$ during the replenish period is carried out in step 280 and the control goes to step 310. Concretely, the ratio GNE, between the engine rotational speed $NE_1$ at the speed change command and the output shaft rotational speed $No_1$ calculated in step 264 is applied in Equation (2), that is, $NEr_1 = GNE_0 \times No$, so that the target rotational speed $NEr_1$ is obtained.

When the determination in step 270 is positive, the value of the flag is set to 2 (the start of the target engine rotational speed control during the inertia phase) for the control process of the next calculation period.

The control goes to step 300 to calculate the target engine rotational speed $NEr_2$ during the inertia phase (and during the control period thereafter) as explained with FIG. 6.

The control goes to step 310 to calculate the driving duty ratio provided to the oil pressure regulator 19 to make the real engine rotational speed NE come close to the target engine rotational speed NEr ($NEr_1$ and $NEr_2$) and carries out the target engine rotational speed control generating the driving duty ratio.

That is, when the control goes to step 310 from step 280, the real engine rotational speed NE is controlled to come close to the target engine rotational speed $NEr_1$ during the replenish period. When the control proceeds from step 290, the target engine rotational speed control to maintain the engine rotational speed $NE_2$ as the target engine rotational speed $NEr_2$ is carried out.

Step 320 determines whether or not the target engine rotational speed control reaches the complete condition. That is, step 320 determines the completion of the control when the engine rotational speed NE is below the value (NT+Nst) by using the control switch threshold Nst (=target slip quantity ΔS+determination quantity ΔH) determined by response characteristics of the hydraulic system and the present turbine rotational speed NT.

When the determination in step 320 is positive, the control goes to step 330 to set the flag to zero for the control process of the next calculation period.

When the determination in step 320 is negative, control skips the process in step 330.

When the value of the flag is 1 in step 240, the control goes to step 270 because it is determined that the speed change command has already been generated and the control has been in the replenish period.

When the value of the flag is 2 in step 240, the control goes to step 300 because it is determined that the inertia phase has already been started.

When the determination in step 230 is negative, the control goes to step 350.

Step 350 sets the value of the flag to zero in case the control comes off the slip area in the middle of the target slip quantity control.

Step 360 determines whether or not the control is in the complete closing area. When the determination in step 360 is positive, the control goes to step 370 to control the complete closing area, that is, to control generation of the maximum duty ratio to the liquid pressure regulator 19.

When the determination in step 360 is negative, the control is in the opening area. The control goes to step 380 to carry out the opening control, that is, to perform control to provide the minimum duty ratio to the liquid pressure regulator 19.

After each process is completed in the above-described steps, the control returns to step 220 to repeat the same procedure.

The target slip control for controlling the real slip quantity of the torque converter 1 to the target slip quantity is carried out as before; however, in the present embodiment, the target engine rotational speed control controls the real engine rotational speed NE to come close to the target engine rotational speed NEr during the inertia phase so that unnecessary change in the turbine rotational speed NT does not superimpose onto the engine rotational speed NE.

That is, by carrying out the target engine rotational speed control as described above, abnormal change in the engine rotational speed NE does not occur during the inertia phase, so that vibration of the needle in the tachometer, change in the sound of the engine and the like are not produced. Therefore, abnormal speed change shocks due to the speed change are not generated.

Especially, in the present embodiment, not only during the inertia phase but during the replenish period, the target engine rotational speed $NEr_1$ is set by using the ratio GNEo between the engine rotational speed $NE_1$ of the speed change command time $t_1$ and the output shaft rotational speed $No_1$, so that the transfer from the target slip quantity control started before to the target engine rotational speed control is carried out smoothly without shocks and the like.

Although the engine rotational speed $NE_2$ at the start time $t_2$ of the inertia phase is set to the target engine rotational speed $NEr_2$ in step 300, other than that, for example, a value in which a predetermined value is added to the engine rotational speed $NEr_2$ (or a value in which the engine rotational speed $NEr_2$ is multiplied by a predetermined coefficient) is set to the target engine rotational speed $NEr_2$ by considering detection errors may be used, or a value in which a predetermined value is added to the turbine rotational speed $NT_2$ (or the turbine rotational speed $NT_2$ is multiplied by a predetermined coefficient) at the time $t_2$ can be set to the target engine rotational speed $NEr_2$ may be used.

Second Embodiment

Next, a second embodiment is explained; however, because the hardware construction and the like in the first embodiment are similar to that in the second embodiment, only the different portions therebetween are explained.

In the present embodiment, a predetermined reduction slope is provided to the target engine rotational speed at the inertia phase.

The target engine rotational speed control which is the main portion of the present embodiment is explained with reference to FIG. 8.

Figure 8:
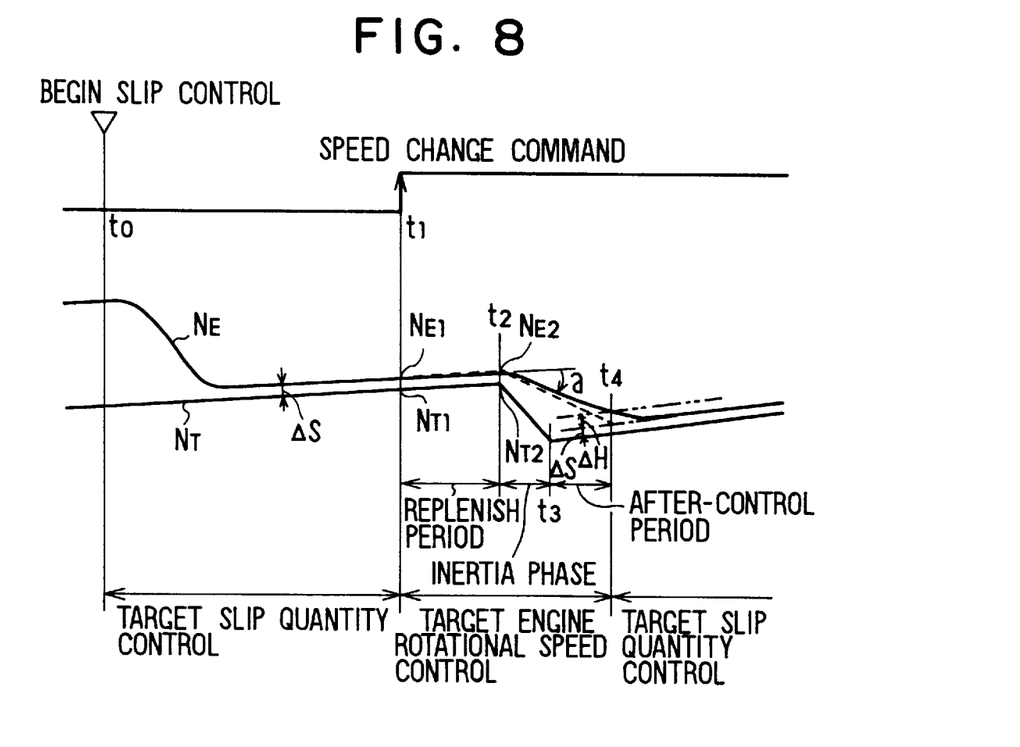
FIG. 8 is an explanatory view of a slip control including a target engine rotational speed control according to a second embodiment of the present invention.

As shown in FIG. 8, the conventional target slip quantity control in which the slip quantity is maintained at the target slip quantity ΔS is carried out.

Next, for the period (replenish period) from the time $t_1$ in which the speed change command is detected to the time $t_2$ in which the start of the inertia phase is detected, the target engine rotational speed $NEr_1$ is determined by using Equations (1) and (2) so that the ratio between the engine rotational speed NE and the output shaft rotational speed No of the transmission matches the time of speed change command.

After the start of the inertia phase is detected, the target engine rotational speed $NEr_2$ is reduced by a predetermined slope from the engine rotational speed $NE_2$ at the inertia phase start time $t_2$. That is, an initial value is set to the engine rotational speed $NE_2$ and the target engine rotational speed $NEr_2$ during the inertia phase is calculated by Equation (3):

$$NEr_2 = NE_2 - a \times t \qquad (3)$$

where a is the predetermined slope and t is a time period from the start of the inertia phase.

Figure 9A:
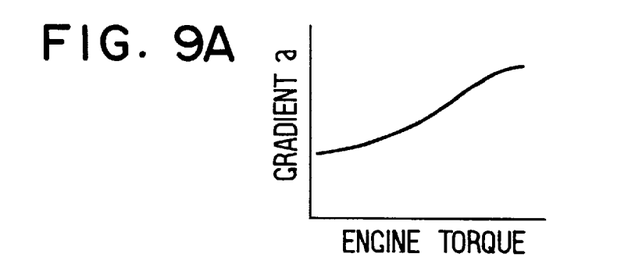
FIGS. 9A–9C are explanatory views of a map determining a slope of the target engine rotational speed according to the second embodiment.
Figure 9B:
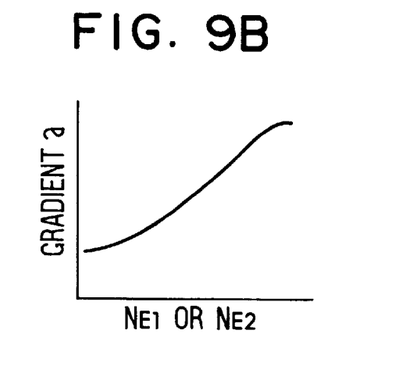
Figure 9C:
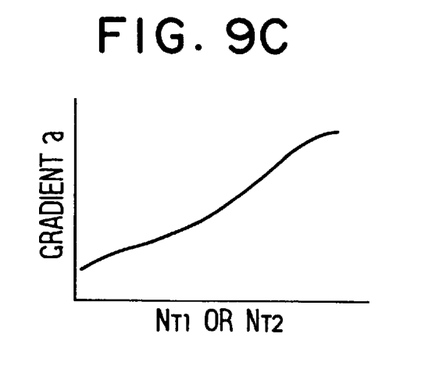

As shown in FIG. 9A, the reduction slope a at this time can be set in response to the engine torque at the speed change command time $t_1$ or the inertia phase start time $t_2$. As shown in FIGS. 9B and 9C, the reduction slope a is set in response to the engine rotational speeds $NE_1$ and $NE_2$ and the turbine rotational speeds $NT_1$ and $NT_2$ at the speed change command time $t_1$ or the inertia phase start time $t_2$.

In either setting method shown in FIGS. 9A–9C, the slope a is set so that the time period in which the engine rotational speed NE in the inertia phase changes is almost constant. That is, when the engine rotational speeds $NE_1$ and $NE_2$ of the engine torque and the turbine rotational speeds $NE_1$ and $NE_2$ are large and the drop of the engine rotational speed is sudden, the slope a is set to be increased (the target engine rotational speed $NE_2$ is reduced quickly).

When the lockup clutch 1 has enough heat capacity, the value of the slope a can always be constant without changing the value in response to the engine rotational speed and the like.

The target engine rotational control is continued after the completion of the inertia phase (at time $t_3$). As in the first embodiment, when the engine rotational speed NE falls below the control switch threshold (=the turbine rotational speed NT+the target slip quantity ΔS+determination quantity ΔH) in which a predetermined slip quantity is added to the turbine rotational speed NT, the control is switched to the normal target slip quantity control.

The control process in the present embodiment is substantially the same as in the flow chart of FIG. 7 in the first embodiment; however, when the target engine rotational speed $NEr_2$ in step 300 is set, a constant value as the target engine rotational speed $NEr_2$ is not obtained. Instead, a value which is reduced at a constant ratio by the slope "a" as time passes is obtained.

Therefore, the same effect as in the first embodiment is obtained and the slip quantity which is the difference between the real engine rotational speed NE and the turbine rotational speed NT is reduced compared with the first embodiment, so that the energy transmission loss can be reduced and the fuel consumption is reduced.

In the present embodiment, by setting the slope a in response to the engine rotational speeds $NE_1$ and $NE_2$ and the turbine rotational speeds $NT_1$ and $NT_2$, the time in which the engine rotational speed NE in the inertia phase changes is set to be almost constant. Therefore, because the proper target engine rotational speed $NE_2$ in response to the drop of the real engine rotational speed can be set, the slip quantity becomes appropriate and the proper torque amplification can be obtained and the transmission loss can be reduced.

Further, in the present embodiment, because the slope a is maintained at a predetermined value during the inertia phase, the control can be simplified.

The present invention having been described should not be limited to the disclosed embodiments, but it may be modified in many other ways without departing from the scope and the spirit of the invention.

For example, in the first and second embodiments, although the engine rotational speed is controlled to the target engine rotational speed by regulating the engagement force of the lockup clutch, the engine rotational speed can be controlled to the target engine rotational speed by regulating the throttle opening degree or using the torque control such as an ignition delay angle, or combining the two.

In the second embodiment, as shown in FIGS. 9B and 9C, for the time in which the engine rotational speed and the turbine rotational speed for setting the slope are obtained, the speed change command time or the inertia phase start time are available, and the times have merits. For example, the engine rotational speed and the turbine rotational speed before entering the inertia phase can be obtained without fail by using the value at the speed change command time and the rotational speeds are reflected in the slope to increase reliability of the control. When the inertia phase start time can be detected assuredly, the engine rotational speed and the like at the real inertia phase start time can be obtained, so that the value in response to the changes in the real engine rotational speed can be set.

Such changes and modifications are to be understood as being included with the scope of the present invention as defined by the appended claims.

What is claimed is:

1. A control device for an automatic transmission having a lockup clutch, the control device comprising:

slip quantity calculating means for calculating a slip quantity between an input shaft and an output shaft of a torque converter;

engaging force regulating means for regulating an engaging force of the lockup clutch disposed with the torque converter in parallel, so that slip control of the lockup clutch for controlling the slip quantity to a predetermined target slip quantity is carried out; and detecting means for detecting a start of an inertia phase during a speed change of the automatic transmission;

wherein when the start of the inertia phase is detected by the detecting means, a target engine rotational speed is calculated according to one of an engine rotational speed when the inertia phase starts and a value based on the engine rotational speed when the inertia phase starts, and a target engine rotational speed control is carried out so that the engine rotational speed is controlled to come close to the target engine rotational speed.

2. A control device of an automatic transmission having a lockup clutch according to claim 1, wherein the engaging force regulating means is for regulating the engaging force to effect target engine rotational speed control.

3. A control device of an automatic transmission having a lockup clutch according to claim 1, further comprising engine torque regulating means for regulating engine output torque to perform target engine rotational speed control.

4. A control device of an automatic transmission having a lockup clutch according to claim 1, wherein the target engine rotational speed control is completed when the engine rotational speed falls below a predetermined value calculated from the turbine rotational speed of the torque converter and the target slip quantity.

5. A control device of an automatic transmission having a lockup clutch according to claim 1, wherein the target engine rotational speed is set so that one of the engine rotational speed when the inertia phase starts and the value based on the engine rotational speed when the inertial phase starts becomes uniform.

6. A control device of an automatic transmission having a lockup clutch according to claim 1, wherein the target engine rotational speed is controlled to be reduced at a predetermined slope from one of the engine rotational speed when the inertia phase starts and the value based on the engine rotational speed when the inertia phase starts.

7. A control device of an automatic transmission having a lockup clutch according to claim 6, further comprising slope setting means for setting the predetermined slope in response to an amount of engine torque.

8. A control device of an automatic transmission having a lockup clutch according to claim 6, further comprising slope setting means for setting the predetermined slope based on one of an engine rotational speed when a speed change command is detected and a turbine rotational speed of the torque converter.

9. A control device of an automatic transmission having a lockup clutch according to claim 6, further comprising slope setting means for setting the predetermined slope based on one of the engine rotational speed and turbine rotational speed of the torque converter at the start of the inertia phase.

10. A control device of an automatic transmission having a lockup clutch according to claim 6, further comprising slope setting means for setting the predetermined slope so that slopes of change in the engine rotational speed are substantially fixed.

11. A control device of an automatic transmission having a lockup clutch according to claim 6, further comprising slope setting means for setting the predetermined slope so that time of change in the engine rotational speed is substantially fixed.

12. A control method of an automatic transmission having a lockup clutch, said method comprising:

regulating engaging force of the lockup clutch disposed with a torque converter in parallel; and controlling slip quantity between an input shaft and an output shaft of the torque converter to a predetermined target slip quantity, wherein:

when a start of an inertia phase is detected during a speed change of the automatic transmission, a target engine rotational speed is calculated according to one of an engine rotational speed when the inertia phase starts and a value based on the engine rotational speed when the inertia phase starts; and a target engine rotational speed control for controlling engine rotational speed to come close to the target engine rotational speed.

* * * * *